United States Patent
Azibert

(10) Patent No.: US 7,370,864 B2
(45) Date of Patent: May 13, 2008

(54) BALANCED MECHANICAL SEAL ASSEMBLY

(75) Inventor: Henri V. Azibert, Windham, NH (US)

(73) Assignee: A.W. Chesterton Company, Stoneham, MA (US)

(*) Notice: Subject to any disclaimer, the term of this patent is extended or adjusted under 35 U.S.C. 154(b) by 347 days.

(21) Appl. No.: 10/791,514

(22) Filed: Mar. 1, 2004

(65) Prior Publication Data
US 2004/0227297 A1   Nov. 18, 2004

Related U.S. Application Data

(60) Provisional application No. 60/450,797, filed on Feb. 28, 2003.

(51) Int. Cl.
*F16J 15/34* (2006.01)
(52) U.S. Cl. .................... 277/358; 277/370
(58) Field of Classification Search ............ 277/358, 277/361, 365, 367, 368, 370, 371, 375, 387, 277/388, 408
See application file for complete search history.

(56) References Cited

U.S. PATENT DOCUMENTS

| | | | | |
|---|---|---|---|---|
| 5,088,745 | A * | 2/1992 | Peppiatt et al. ............ | 277/579 |
| 5,203,575 | A | 4/1993 | Azibert et al. | |
| 5,213,304 | A | 5/1993 | Fujikawa | |
| 5,213,340 | A * | 5/1993 | Azibert et al. ............ | 277/367 |
| 5,333,882 | A * | 8/1994 | Azibert et al. ............ | 277/367 |
| 5,354,070 | A * | 10/1994 | Carmody ................. | 277/370 |
| 5,403,019 | A * | 4/1995 | Marshall ................. | 277/413 |
| 5,489,105 | A * | 2/1996 | Attenasio et al. ......... | 277/370 |
| 5,571,268 | A | 11/1996 | Azibert | |
| 5,711,532 | A | 1/1998 | Clark et al. | |
| 5,725,220 | A | 3/1998 | Clark et al. | |
| 5,913,520 | A * | 6/1999 | Clark et al. ............. | 277/370 |
| 5,984,313 | A * | 11/1999 | Kraus ..................... | 277/396 |
| 6,267,382 | B1 * | 7/2001 | Auber .................... | 277/390 |
| 6,494,458 | B2 * | 12/2002 | Uth ....................... | 277/358 |
| 6,588,763 | B1 * | 7/2003 | Jones et al. ............. | 277/448 |
| 6,848,689 | B2 * | 2/2005 | Auber .................... | 277/377 |
| 6,935,632 | B2 * | 8/2005 | Azibert et al. ........... | 277/370 |

FOREIGN PATENT DOCUMENTS

WO      WO0057090 A1 *   9/2000

* cited by examiner

*Primary Examiner*—Patricia Engle
*Assistant Examiner*—Gilbert Lee
(74) *Attorney, Agent, or Firm*—Lahive & Cockfield, LLP; Anthony A. Laurentano, Esq.

(57) ABSTRACT

A mechanical seal for providing a fluid-tight seal between a rotating shaft and a stationary housing comprises a first pair of seal members for sealing and separating a process fluid from a barrier fluid and a shuttle. The first pair of seal members comprises a first rotatable seal ring having a rotary seal face and a first stationary seal ring having a stationary seal face engaging the rotary seal face. The shuttle member is positioned relative to the rotary seal ring or the stationary seal ring and axially movable between a first position and a second position in response to changing pressure conditions within the mechanical seal thereby maintaining the mechanical seal regardless of the change in pressure conditions.

43 Claims, 9 Drawing Sheets

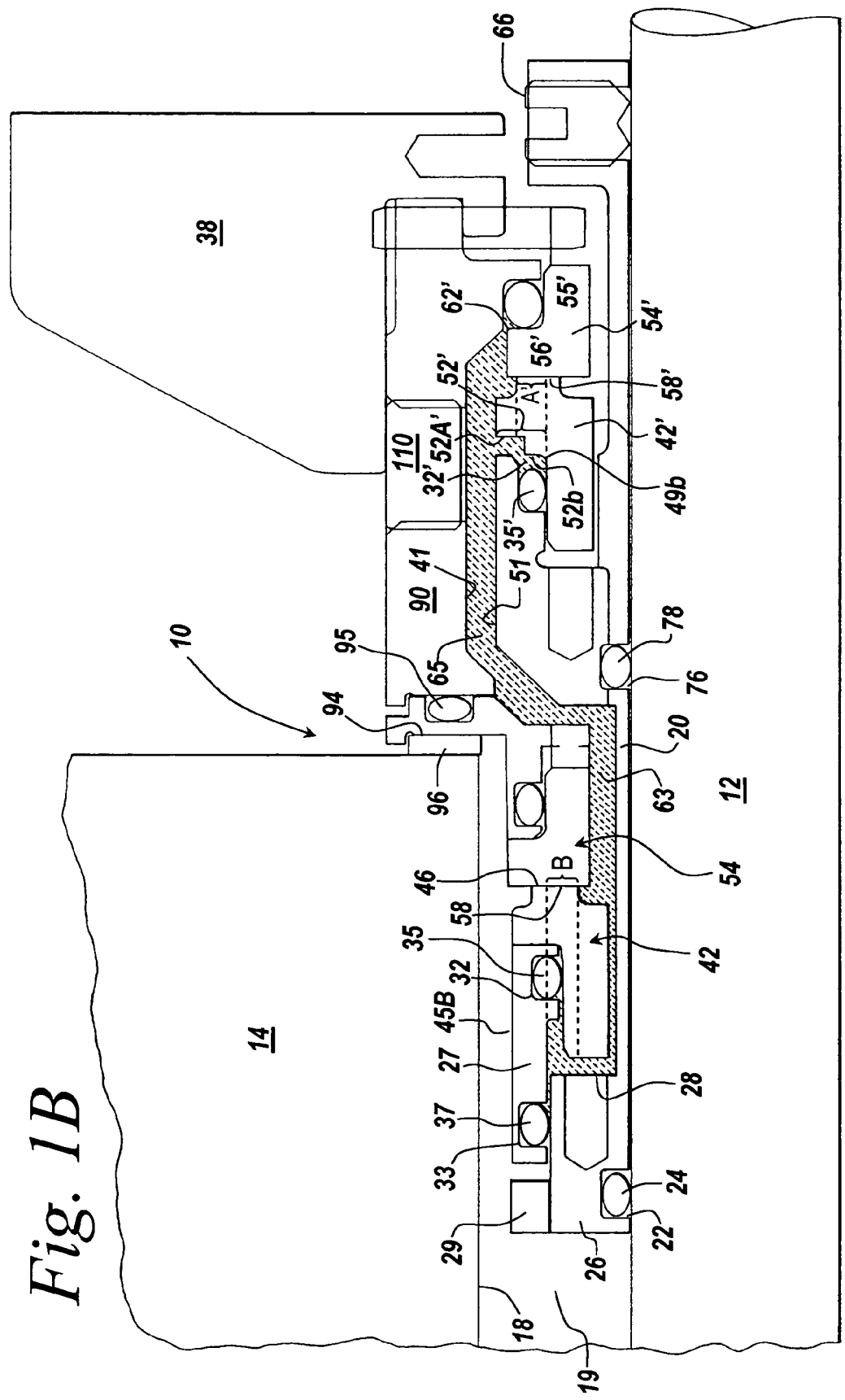

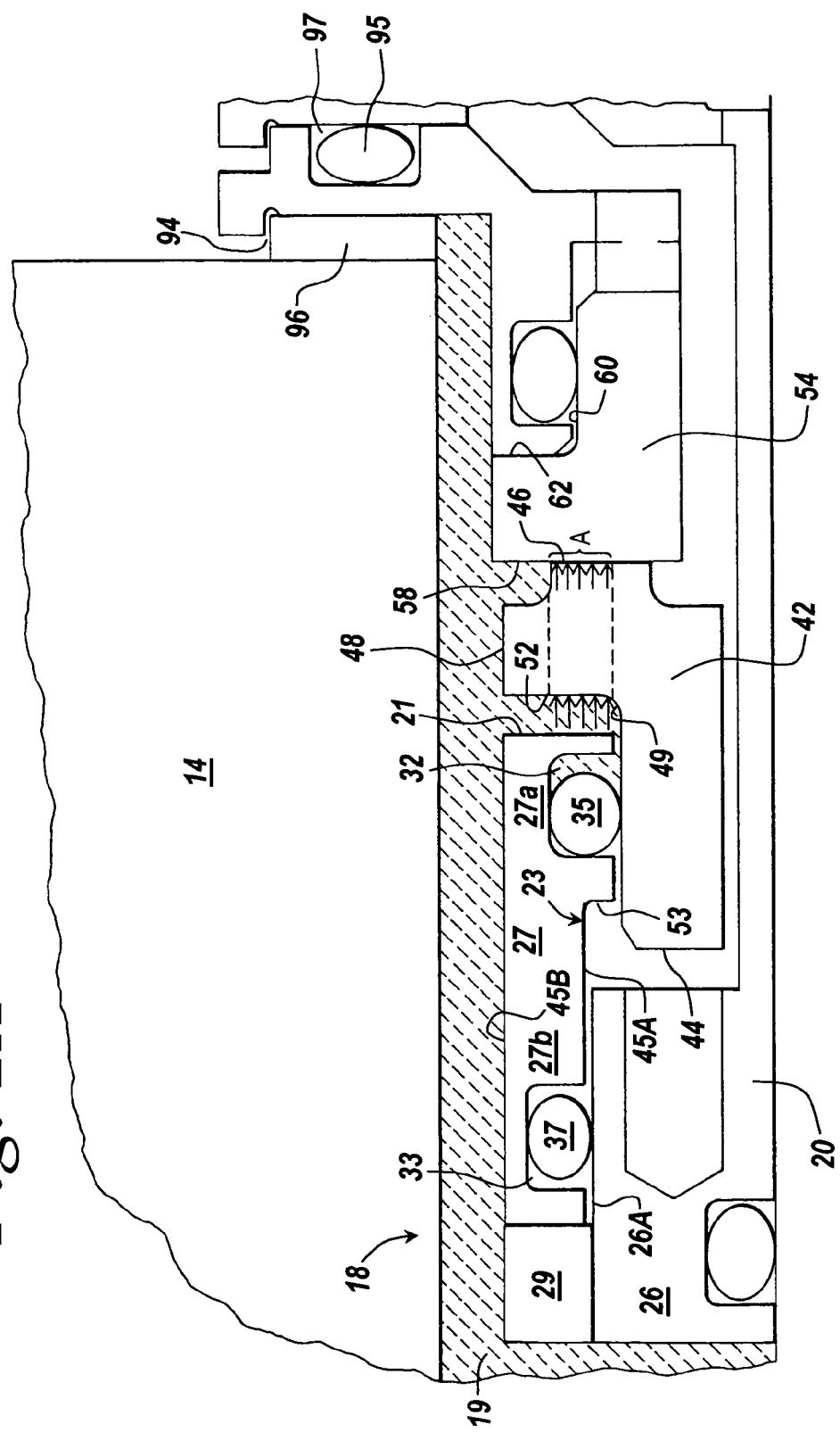

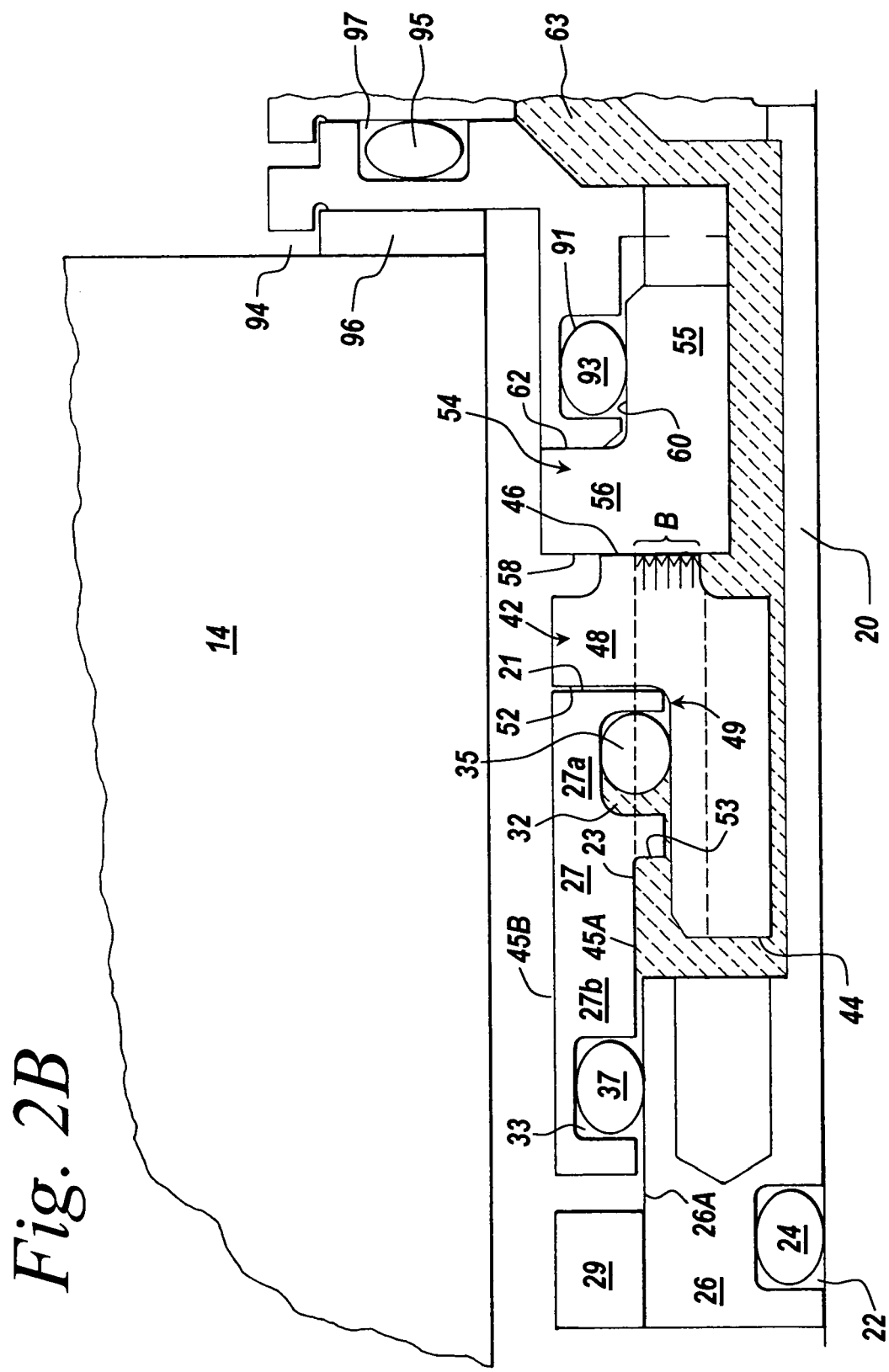

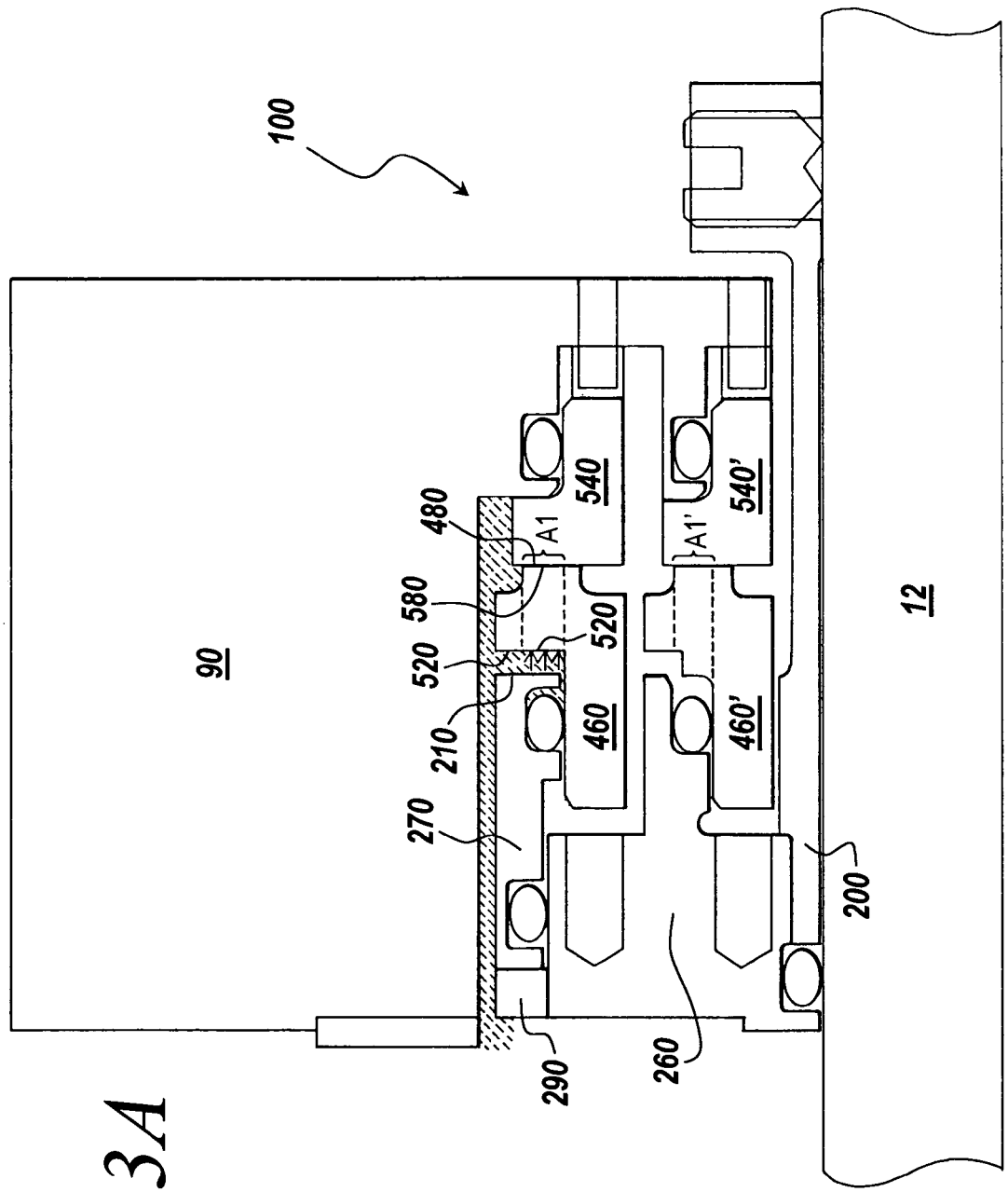

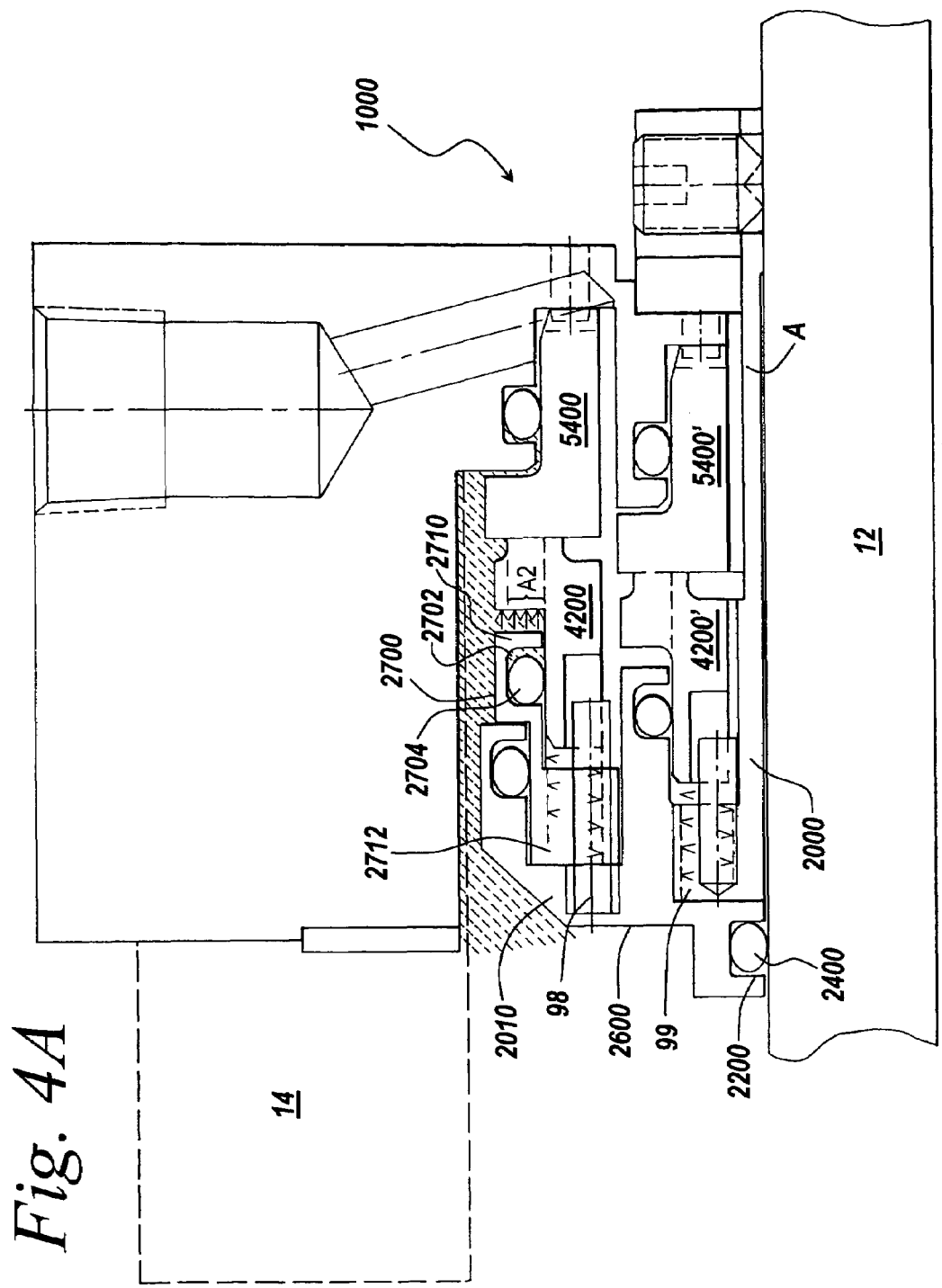

BALANCED MECHANICAL SEAL ASSEMBLY

RELATED APPLICATIONS

The present application claims priority to U.S. Provisional Patent Application Ser. No. 60/450,797, entitled "Balanced Mechanical Seal Assembly", filed Feb. 28, 2003, the contents of which are herein incorporated by reference. This application is entitled "Balanced Mechanical Seal Assembly," filed on even date herewith, the contents of which are herein incorporated by reference.

FIELD OF THE INVENTION

The present invention relates to a balanced mechanical seal and more particularly to a double balanced mechanical seal for providing a seal between a rotating shaft and a stationary housing.

BACKGROUND OF THE INVENTION

Conventional mechanical seals are employed in a wide variety of mechanical apparatuses to provide a pressure-tight and a fluid-tight seal between a rotating shaft and a stationary housing. The seal is usually positioned about the rotating shaft, which is mounted in and protrudes from the stationary housing. The seal is typically bolted to the housing at the shaft exit, thus preventing loss of pressurized process fluid from the housing. Conventional mechanical seals include face type mechanical seals, which include a pair of annular sealing rings that are concentrically disposed about the shaft, and axially spaced from each other. The sealing rings each have seal faces that are biased into physical contact with each other. Usually, one seal ring remains stationary, while the other ring contacts the shaft and rotates therewith. The relatively rotating, contacting seal faces isolate and seal a pressurized liquid, i.e., the process fluid, along the rotating shaft. The mechanical seal prevents leakage of the pressurized process fluid to the external environment by biasing the seal ring sealing faces into physical contact with each other.

To cool the seals and to aid in preventing any passage of process fluid across the seal faces, a second pressurized liquid, i.e., a barrier fluid, is often introduced to the seals on the side of the seal faces opposite that in contact with the process fluid. Springs normally bias the seal faces together. In balanced seal arrangements, the pressurized fluids are also applied to piston areas defined on the sides of the seal members opposite the seal faces to aid in closing the seal faces. This relationship minimizes heat generation from the frictional contact of the seal faces while maintaining a closing force on the seal faces sufficiently high to ensure proper sealing. It is also desirable to minimize the contact area of the seal faces so as to minimize heat generation as the seal faces rotate relative to each other. Additionally, when a barrier fluid is employed, a double seal arrangement is utilized in which the process fluid is confined to one end of the seal and the barrier fluid to the center of the seal with relatively rotating seal faces on either side of the barrier fluid.

In one type of double balanced seal in the prior art, both fluids have access to the rear of the seal members opposite the seal faces, and the desired balance ratio of the piston area to the seal face contact area is achieved by providing O-rings slidable in their O-ring grooves behind the respective seal faces of the seal members. Thus, the O-rings slide in the grooves to permit application of fluid pressure from the fluid having the highest pressure to the appropriate piston areas on the sides of the seal members opposite the seal faces. Springs may be located within the seal on either side of the seal faces and may be exposed to either or both of the process and barrier fluids.

Prior double-balanced mechanical seal assemblies have significant drawbacks. First, the piston areas in prior double-balanced mechanical seal assemblies are dependent upon the size and configuration of the O-rings. As the inner and outer diameters of the O-rings define the balance pressure points for the respective fluids, the radial contact dimension of the seal faces must be sufficiently large to account for the thickness of the O-rings. This limits the design of the seal faces for which minimum contact area is desired to reduce heat generation.

An additional drawback of double-balanced mechanical seal assemblies of the prior art is that the double-balanced seal does not operate efficiently under reverse pressure conditions. Under reverse pressure conditions, the O-rings slide in their grooves to achieve sealing. Furthermore, the process fluid, which may be dirty and include contaminants, causes dirt and other particles to get caught in the sliding O-ring interface, which causes wear and O-ring hang-up over time, thereby negatively impacting seal performance.

SUMMARY OF THE INVENTION

The present invention provides a mechanical seal for providing a fluid-tight seal between a rotating shaft and a stationary housing. The mechanical seal comprises a first pair of relatively rotatable annular seal members for sealing and separating a process fluid from a barrier fluid. The first pair of relatively rotatable annular seal members comprises a first rotatable seal ring having a rotary seal face and a first stationary seal ring having a stationary seal face engaging the rotary seal face. The first pair of seal members further includes generally radially extending piston areas on the rear sides of the primary seal members for biasing, under pressure, the seal faces together. The piston areas are at least in part defined by a movable shuttle member that is connected to the rotary seal ring and a sleeve, which is in turn connected to the rotating shaft. Under normal operating conditions, when the process fluid pressure is greater than the barrier fluid pressure, the process fluid exerts a force on a first piston area A of the rotary seal ring to bias the seal faces together. Under reverse operating pressure conditions, when the barrier fluid pressure is greater than the process fluid pressure, the barrier fluid exerts a force on a second piston area, e.g., the piston area B of the stationary seal ring, to bias the seal faces together. The piston areas are smaller than the overall contact area of the seal faces. The first piston area is substantially identical in size to the second piston area to provide a balanced seal arrangement for operating under both standard (positive) and reverse (negative) pressure conditions.

The mechanical seal can optionally further include a second pair of annular seal members providing a secondary seal between a barrier fluid and atmosphere, and defining a second pair of annular, radially extending, opposed seal faces therebetween. The second pair of seal members includes a pair of secondary piston areas on the rear sides of the secondary seal members opposite the seal faces for biasing the seal faces together.

The mechanical seal of the invention can include a sleeve, first and second pairs of relatively rotatable seal members having first and second radially extending opposed seal faces forward therebetween. The seal faces can contact each other over predetermined contact areas. The sleeve has a flange at one end thereof defining a stop for a movable shuttle member. The rotary seal ring of each pair of seal members are assembled on the sleeve for rotation therewith. The other or stationary seal rings are adapted for connection to a stationary structure. The movable shuttle member overlies a top surface of the sleeve flange and the first rotatable inboard seal member and slides between different positions in response to varying pressure conditions to define one of two possible piston areas. When the process fluid pressure is greater than the barrier fluid pressure, that is when the mechanical seal is operating in a standard or positive pressure condition, the shuttle member slides toward the shuttle stop formed on the sleeve, defining a first piston area A that is exposed to the process fluid. When the barrier fluid pressure is greater than the process fluid pressure, that is when the seal is operating in a reverse or negative pressure condition, the shuttle piece slides toward the first rotatable seal member, defining a second piston area B, that is exposed to the barrier fluid. The process and barrier fluids generate a closing force on the seal faces to keep them in contact with each other.

Advantageously, a seal according to the present invention provides fixed, predetermined piston areas on the sides of the rotary seal members opposite the seal faces to provide a predetermined and predictable closing force on the seal faces under varying pressures, even under reverse pressure conditions. An individual piston area is exposed to only one of the fluids, although other arrangements are contemplated by the present invention. Further, the contact area of the seal faces may be optimized without any limitation imposed by the size of the O-rings defining the balance pressure points. Because it is possible to design seal faces having a small contact area, heat generation in operation of the seal is minimized. Furthermore, in order to apply a pressure force to close the faces, the movable parts slide over interfaces of the mechanical seal that do not contact the dirty process fluid, and are therefore not subject to clogging or restriction.

According to one aspect of the invention, a mechanical seal for mounting to a housing containing a rotating shaft is provided. The mechanical seal comprises a gland, a rotary seal ring having a rotary seal face, a stationary seal ring having a stationary seal face engaging the rotary seal face and a shuttle member positioned relative to one of the rotary seal ring and the stationary seal ring. The shuttle member is axially movable between a first position and a second position in response to changing pressure conditions within the mechanical seal. The shuttle member is positioned adjacent a non-seal face of one of the seal rings when disposed in the first position and when subjected to a first pressure condition. The shuttle member is axially separated from the non-seal face of the seal ring when disposed in the second position when subjected to a second pressure condition different from the first pressure condition.

According to another aspect of the invention, a method in a mechanical seal for mounting to a housing containing a rotating shaft is provided. The mechanical seal includes a gland, at least one pair of seal members disposed at least partially within the gland, the seal members including a rotary seal ring having a rotary seal face and a stationary seal ring having a stationary seal face engaging the rotary seal face, and a shuttle member positioned relative to one of the rotary seal ring and the stationary seal ring. The method comprises axially moving the shuttle member between a first position and a second position in response to changing pressure conditions within the mechanical seal. The shuttle member is positioned adjacent a non-seal face of one of the seal rings when disposed in the first position and when subjected to a first pressure condition, and is axially separated from the non-seal face of the seal ring when disposed in the second position when subjected to a second pressure condition different from the first pressure condition.

Other features and advantages of the invention will be apparent from the following description of the preferred embodiment thereof and from the claims.

DESCRIPTION OF THE DRAWINGS

FIG. 1B is a cross-sectional view of the mechanical seal of FIG. 1A, wherein the pressure of the barrier fluid is greater than the pressure of the process fluid, i.e., a reverse or negative pressure condition.

FIG. 2A is an enlarged fragmentary view of a portion of the cross-sectional view of FIG. 1A.

FIG. 2B is an enlarged fragmentary view of a portion of the cross-sectional view of FIG. 1B.

FIG. 3A is a cross-sectional view of a mechanical seal according to an alternate embodiment of the invention, wherein the process fluid in the seal has a pressure that is greater than the pressure of the barrier fluid, i.e., a positive or standard pressure condition.

FIG. 4A is a cross-sectional view of a mechanical seal according to another embodiment of the invention, wherein the process fluid in the seal has a pressure that is greater than the pressure of the barrier fluid.

DETAILED DESCRIPTION

Figure 1A:
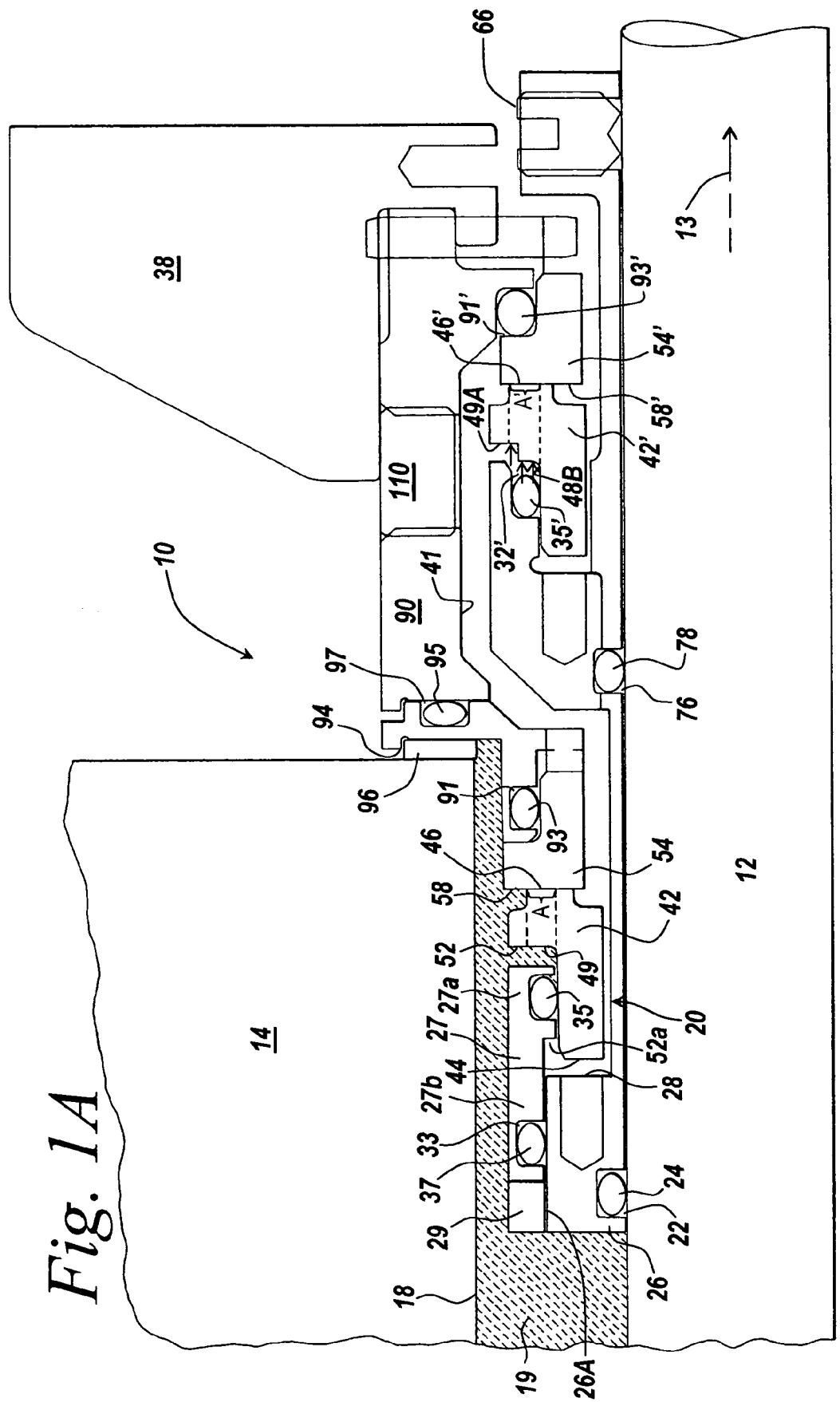
FIG. 1A is a cross-sectional view of a mechanical seal according to an illustrative embodiment of the invention, where the process fluid in the seal has a pressure that is greater than the pressure of the barrier fluid, i.e., a positive or standard pressure condition.

The present invention provides a mechanical seal for mounting to a stationary housing that contains a rotating shaft. The primary seal ring of the inboard seal is arranged to be double balanced so that pressure reversals can be tolerated without loss of closing force. The invention will be described below relative to illustrative embodiments. Those skilled in the art will appreciate that the present invention may be implemented in a number of different applications and embodiments and is not specifically limited in its application to the particular embodiments depicted herein.

The terms "process medium" and "process fluid" as used herein generally refer to the medium or fluid being transferred through the housing. In pump applications, for example, the process medium is the fluid being pumped through the pump housing.

The terms "axial" and "axially" as used herein refer to a direction generally parallel to the shaft axis. The terms "radial" and "radially" refer to a direction generally perpendicular or orthogonal to the shaft axis.

The term "shuttle member" as used herein is intended to include any structure suitable for movement, either axially, radially, or both, between multiple positions within the mechanical seal to enable, assist or facilitate the application of proper closing pressure forces to one or more seal rings when exposed to various pressure conditions (positive and/or negative pressure conditions) to help retain sealing engagement of the seal faces. The shuttle element can be configured to house one or more sealing elements, or none if desired, for sealing one or more seal fluids. According to a preferred embodiment, the shuttle element as used and defined herein is not intended to cover a member or device that includes only an O-ring. Although various embodiments are disclosed herein, the shuttle member can be configured in many different ways. For example, one of ordinary skill, in light of the teachings of the present invention, is capable of configuring or providing a proper shuttle member configuration when considering one or more of the pressure conditions within the seal, the type of seal, the type, number and configuration and location of the seal rings, the type of application, and various other considerations. Those of ordinary skill will also recognize that the shuttle element can be positioned at different locations, and need not necessarily be positioned adjacent the rotary seal ring. For example, the shuttle element can be positioned adjacent the stationary seal ring. The shuttle member can also comprise one or more parts or components, and hence can form an assembly or be provided as part of an assembly. Not all parts of the assembly need be movable.

The term "mechanical seal" as used herein is intended to include various types of mechanical seals, including single seals, split seals, tandem or dual seals, gas seals, spiral seals, and other known seal types and configurations.

The term "gland" as used herein is intended to include any suitable structure that enables, facilitates or assists securing the mechanical seal to a housing, while concomitantly surrounding or housing, at least partially, one or more seal components. If desired, the gland can provide fluid access to the mechanical seal.

Referring now to the drawings and more particularly to FIGS. 1A and 1B, a mechanical seal 10 according to an illustrative embodiment of the invention is concentrically mounted on a pump shaft 12 and is secured to a pump housing 14 by bolts (not shown) passing through the bolt tabs 38. The shaft 12 extends along a first axis 13. The mechanical seal 10 extends partially into the stuffing box 18 of the pump housing 14. The mechanical seal 10 is constructed to provide fluid sealing between the housing 14 and the shaft 12, thereby preventing a pressurized process fluid 19 from escaping the housing 14. Fluid sealing is primarily achieved by a first or inboard pair of primary seal members, forming a first or inboard seal, comprising a rotary seal ring 42 and a stationary seal ring 54, each having a radially extending arcuate seal face 46 and 58, respectively. The seal faces 46 and 58 of the inboard primary sealing members are biased into sealing relationship or engagement with each other, as described in greater detail below. A second or outboard pair of primary seal members, forming a second or outboard seal, comprises seal rings 42' and 54'. The seal rings are axially spaced from the first pair of relatively rotatable seal members 42 and 54. The secondary seal rings 42' and 54' have seal faces 46' and 58' that are biased into sealing relationship with each other to provide additional sealing. The first and second pair of primary seal members form a dual or tandem mechanical seal. Examples of conventional tandem seals are described in U.S. Pat. Nos. 5,213,340, 5,333,882, and 5,203,575, the contents of which are incorporated herein by reference. The individual seal surfaces form a fluid tight seal operable under a wide range of operating conditions and in a wide range of services, as described in greater detail below.

According to an alternate embodiment, one or more of the seal rings 42, 42', 54 and 54' can be split into a plurality of seal ring segments having segment sealing faces biased into sealing relationship with each other according to known techniques.

The illustrated mechanical seal 10 includes a sleeve 20 rotatably coupled to the shaft 12, and holds the rotary elements of the mechanical seal 10. At the axially inboard end of the sleeve 20, i.e., the end inserted into the stuffing box 18, a first groove 22 formed on the inner periphery of the sleeve 20 receives a first sealing element, such as O-ring 24, disposed adjacent the shaft 12 to prevent process fluid from passing from the pump between the sleeve 20 and the shaft 12. A second sealing element, such as O-ring 78, is provided in a second groove 76 spaced axially outward from the first groove 22 on the inner periphery of the sleeve 20, toward the outboard end of the mechanical seal, to prevent leakage of barrier fluid between the sleeve 20 and the shaft 12. The sleeve 20 includes a flange 26 at an inboard end thereof having a radially extending face or wall 28. The flange can be integrally formed with the sleeve or can be provided as a separate component. A movable shuttle member 27 and a shuttle stop 29 are disposed on, overlie, or are positioned adjacent to the axially extending outer radial wall 26A of the flange portion of the sleeve 20. A portion of the shuttle member 27 overlies the flange 26. The stop 29 may be integrally formed with or mounted on the wall 26A through means known in the art. The stop 29 has an outer diameter smaller than the inner diameter of the stuffing box 18. The details of the shuttle member 27 and the shuttle stop 29 will be described in detail below.

The primary rotary seal ring 42 is mounted on the sleeve 20 axially outwardly and away from the flange 26. As shown in detail in FIGS. 2A and 2B, the rotary seal ring 42 has a relatively wide seal portion 48 extending from an inner diameter somewhat greater than the outer diameter of the sleeve 20 to an outer diameter slightly smaller than the inner diameter of the stuffing box 18. A narrow axially outwardly facing seal face 46 extends from the seal portion 48 and engages the seal face 58 of the stationary member 54. Axially inwardly from the seal portion 48 of the rotary seal ring, an axially extending surface or step 49 is provided having an outer diameter smaller than the outer diameter of the seal portion 48 and helps to define in combination with the seal portion 48 a first axially inwardly and radially extending wall 52. The wall is positioned on the side of the sealing portion 48 opposite the seal face 46. The step 49 terminates in a second axially inwardly, radially extending wall 44 that is spaced axially inwardly from the wall 52. The rotary seal ring 42 may include a plurality of notches on the seal portion 48 inner diameter. The notches may engage bosses on the sleeve 20 for locking the rotary seal member 42 to the sleeve 20 and/or the shuttle member 27 for rotation therewith.

The movable shuttle member 27 is configured to move between a first position where it abuts the shuttle stop 29 (as shown in FIGS. 1A and 2A) and a second position where the shuttle member 27 abuts the first facing wall 52 of the primary rotary seal member 42 opposite the seal face 46 (as shown in FIGS. 1B and 2B). The movable shuttle member 27 comprises an elongated annular ring configured to slide over the outer surfaces of the sleeve 20 and the rotary seal ring 42. The shuttle member 27 oscillates or axially moves between the two positions in response to varying pressure conditions within the mechanical seal.

For example, when the seal 10 is subjected to a positive pressure condition, i.e., when the process fluid has a higher pressure than the barrier fluid (as shown in FIGS. 1A and 2A), a pressure differential results across the shuttle member 27 that forces the shuttle member to move or slide to the first position, abutting or disposed adjacent to the shuttle stop 29. When the barrier fluid 63 has a higher pressure than the process fluid (as shown in FIGS. 1B and 2B), a reverse pressure differential forces the shuttle member 27 to move away from the shuttle stop 29 and into the second position, abutting the wall 52 of the rotary seal ring 42.

The shuttle member 27 comprises a carrier element having an axially disposed outer portion 27a formed at one end and an axially disposed inner portion 27b formed at the opposite end that is narrower than the axially outer portion 27a. The axial outer portion 27a of the shuttle member 27 has an inner diameter defined by inner surface 45A that is slightly greater than the outer diameter of the step 49 of the rotary seal ring 42 and has an outer diameter defined by outer surface 45B that is slightly less than the inner diameter of the stuffing box 18, such that the axially outer portion 27a overlies the step 49 of the rotary seal ring 42. A first groove 32 is formed on the inner surface 45A of the shuttle member. Specifically, the groove is formed in the axially outer portion 27a and receives a third sealing element or O-ring 35 for sealing process fluid from barrier fluid in the seal. A surface or step 23 is provided axially inwardly from the axially outer portion 27a, having an inner diameter increased relative to the inner diameter of the axially outer portion 27a and defining an axially inwardly facing wall 53 on the side of the shuttle outer portion opposite the front wall 21 of the shuttle member 27. The axially inner portion 27b of the shuttle member 27 has an inner diameter slightly greater than the outer diameter of the flange 26 and an outer diameter slightly less than the inner diameter of the stuffing box 18, such that the axially inner portion 27b overlies and seals against the flange 26. The shuttle member includes a second groove 33 formed on the inner surface of the axially inner portion 27b, which seats a fourth O-ring 37, for sealing process fluid from barrier fluid in the mechanical seal 10.

Referring again to FIGS. 1A-2B, the rotary seal ring 42 of the first pair of primary seal members defines generally radially extending piston areas A, B on the non-seal face or rear sides thereof. The piston areas are radially aligned with and smaller than the total contact area of the seal faces 46, 58, each piston area being a predetermined fixed area equal to a major portion of the contact area. Both piston areas extend radially inwardly from an outer diameter of the seal rings and are in fluid communication with the inner periphery of the primary rotary seal member 42. The first piston area A is disposed radially outwardly of the second piston area B and allows process fluid 19 to exert pressure on a radially outward portion of the seal face 46. The second piston area B allows the barrier fluid 63 to exert pressure on a radially inward portion of the seal face 46. The radially outer piston area A serves as a piston area for the process fluid and the radially inner piston area B serves as a piston area for the barrier fluid. The primary rotary seal member 42 and the shuttle member 27 cooperate to permit either the process fluid to exert pressure on the primary seal faces via the first piston area A or the barrier fluid to exert pressure on the seal faces 46, 58 via the second piston area B, depending on which fluid has a higher pressure. Each piston area transmits a net pressure from one of the fluids toward the first pair of sealing faces. In each pressure condition, a selected area of the seal face area is exposed to a closing pressure applied to or acting on one of the piston areas. According to a preferred embodiment, about 70% of the seal face area is exposed.

By way of example, when the shuttle member 27 abuts the shuttle stop 29, as shown in FIGS. 1A and 2A, the front wall 21 of the shuttle member 27 is axially spaced from the axially inwardly facing wall 52 of the first rotary seal ring 42, opposite the seal face 46, to permit fluid access therebetween, thus forming piston area A on the wall 52. Piston area A is defined by or measured between the radially outermost edge of the seal face 46 and the step 49. The piston area A is exposed to a force from the process fluid that is applied or transmitted to the radially extending wall 52 to the seal face 46. The force arrows illustratively represent the closing force generated by at least the process fluid 19 and applied to the piston area A (FIG. 2A).

When the shuttle member 27 abuts the rotary seal member 42, as shown in FIGS. 1B and 2B, the step wall 53 on the shuttle member 27 and the axially inwardly facing wall 44 on the end of the rotary seal ring form piston area B opposite the seal face 46. More specifically, the piston area B is defined by or measured between the radially innermost edge of the sealing face 46 and the shuttle inner surface 45A. The barrier fluid 63 applies a force to the seal ring on the piston area B of the seal face 46. The force arrows illustratively represent the closing force generated by at least the barrier fluid and applied to the piston area A (FIG. 2B). The shuttle member 27 generates or applies a biasing or closing force to or against the seal ring 42 when disposed in this position to help maintain seal face contact. The size of the piston areas A and B can be varied by adjusting the radial extent of the step 49 of the seal ring 42 and the surface 45A of the shuttle member 27.

The stationary seal ring 54 is provided axially outwardly of the rotary seal ring 42. The stationary seal ring 54 has a relatively wide seal portion 56 having a correspondingly wide, axially inwardly facing seal face 58. The wide seal portion 56 extends from an inner diameter somewhat greater than the outer diameter of the sleeve 20 to an outer diameter slightly smaller than the inner diameter of the stuffing box 18. Outwardly of the seal portion 56 of the stationary seal member 54, a secondary sealing portion 55 is defined by a step 60 at an outer diameter reduced relative to the outer diameter of sealing portion 56 and defining an axially outwardly facing wall 62 on the rear side of the sealing portion 56 opposite the seal face 58.

According to a preferred embodiment, the stationary seal 54 is made of silicon carbide and the rotary seal member 42 is made of carbon. One skilled in the art will recognize that the seal members may be formed of other suitable materials and are not limited to carbon and/or silicon carbide.

Referring again to FIGS. 1A and 1B, the secondary pair of seal members 42' and 54' are provided axially outwardly from the first pair of seal members 42 and 54 in a manner similar to the orientation of the first pair of seal members. The second rotary seal ring 42' is similar to the first rotary seal ring 42, and the corresponding portions thereof are designated with the same reference numerals with a superscript prime. A difference between the rotary seal ring 42 and the second rotary seal ring 42' is the axially inwardly facing wall 52' on the side of the sealing portion 48' opposite the seal face 46'. The axially inwardly facing wall 52' of the secondary rotary seal ring 42' includes two steps 49a and 49b, resulting in two axially spaced, inwardly facing walls 52a' and 52b' opposite the seal face 46'. As shown, the sleeve 20 is configured to overlie at least a portion of the second rotary seal ring 42'. The sleeve 20 and the step 49b form a groove 32', which receives a sealing element, such as O-ring 35', for sealing barrier fluid in the seal from the atmosphere or an external environment.

Similarly, positioned axially outwardly of the second rotary seal ring 42', a second stationary seal ring 54', substantially identical to the first stationary seal ring 54, is provided, with a seal face 58' contacting the seal face 46' of the second rotary seal ring 42'. The portions of the second stationary seal ring 54' are designated with the same reference numerals with a superscript prime, as the corresponding portions of the first stationary seal member 54.

The mechanical seal 10 preferably includes a gland 90 for housing one or more of the seal components and for providing fluid passages through which the barrier fluid is introduced to at least one of the first and second pairs of seal members. The barrier fluid transfers heat away from the seal faces to reduce the effects of thermal stress on the seal faces and further aids in preventing the passage of process fluid across the seal faces. The gland 90 is centered on the stationary housing 14 and secured thereto. The gland has an inner surface 41 that is radially spaced from an outer surface 51 of the sleeve to define a chamber 65 for the barrier fluid. The gland 90 can include conventional grooves to house sealing components in order to prevent process fluid from leaking. In particular, the illustrated gland 90 includes a groove 94 disposed at an inboard end, i.e. the end towards the housing 14, that is sized and configured for seating a relatively flat gasket 96 that is placed in facing engagement with the housing 14. The illustrated gland 90 further includes an O-ring 95 seated in a groove 97. The illustrated gasket 96 prevents process fluid from leaking between the housing 14 and the mechanical seal 10. The illustrated O-ring 95 prevents leakage of barrier fluid.

According to alternate embodiments, the gland 90 includes a pair of generally identical gland segments, or comprises an assembly of several gland segments.

The illustrated gland 90 may further include a plurality of bolt tabs 38 that extend outwardly therefrom for mounting the gland and the seal assembly to the pump housing 14. The bolt tabs have a main body that has an integrally formed inserting tab projection that is adapted to mount in an annular channel formed in the outer surface of the gland 90. The angular position of the bolt tabs 38 can be adjusted by sliding the tab projection in the channel. The bolt tabs 38 help secure the mechanical seal to the housing 14 by seating mounting bolts (not shown) between adjacent ones of the tabs. In use, the mounting bolt is inserted between a pair of adjacent bolt tabs. The bolt tabs 38 are described in further detail in U.S. Pat. No. 5,209,496, assigned to the assignee hereof, which is herein incorporated by reference.

The gland 90 further includes a flush port 110 formed between inner and outer surfaces of the gland. The flush port 110 preferably allows communication between the chamber 65 formed between the gland 90 and the sleeve 20 and an external environment, or any selected fluid source coupled thereto. The flush port 110 can have any selected configuration, and is preferably threaded in order to facilitate connection to any suitable fluid conduit. The flush port 110 may be utilized to introduce barrier fluid 63 to the chamber 65.

As shown, the gland 90 forms a first groove 91 with the primary stationary seal ring 54 and a second groove 91' with the secondary stationary seal ring 54'. The grooves 91, 91' receive O-rings 93, 93', respectively, which provide sealing between the gland 90 and the stationary seal rings 54, 54'.

The O-ring 78 mounted in the groove 76, the O-ring 35', and the O-ring 93' all help seal the barrier fluid from atmospheric pressure.

A lock ring 66 is mounted on the sleeve 20 at the outer end thereof and mechanically couples the sleeve 20 to the shaft 12. The lock ring 66 may include a radially enlarged outer end having threaded apertures aligned with apertures for receiving fasteners locking the seal assembly to the shaft 12 for rotation therewith. The enlarged end of the lock ring 66 also has threaded apertures aligned with apertures in the sleeve 20 for receiving threaded fasteners having cylindrical ends adapted to axially locate the seal components prior to assembly in a pump.

In operation, the sleeve 20 rotates with the shaft 12 and carries with it the primary and secondary rotary seal rings 42 and 42', as well as the lock ring 66 and other rotatable elements of the seal 10. The stationary seal members 54, 54' are held in a stationary position by a lug engaging the gland 90. Process fluid moves between the outer diameter of seal members 42, 54 and the inner diameter of the stuffing box 18. Barrier fluid circulates through the chamber 65. The relatively rotatable seal faces 46, 58 seal the process fluid at the stationary/rotary interface and the O-ring 81 seals process fluid from passing beyond the stationary seal member 54. The relatively rotatable seal faces 46', 58' of the secondary seal members seal the barrier fluid within the seal 10.

When the process fluid pressure is greater than the barrier fluid pressure (standard operating or positive pressure condition), as shown in FIG. 2A, the net force caused by the pressure differential pushes the shuttle member 27 towards the shuttle stop, such that the shuttle member abuts the shuttle stop 29. Process fluid exerts a pressure on piston area A, which transmits a closing force to the rotary seal face 46 to ensure a fluid tight seal between the rotary seal ring 42 and the stationary seal ring 54. Piston area A extends between the fixed outer diameter of the step 49 on the primary seal member 42 and the fixed outer diameter of the rotary seal face 46.

When the barrier fluid pressure is greater than the process fluid pressure (reverse operating or negative pressure condition), the barrier fluid pushes the shuttle member 27 towards the seal ring 42, as shown in FIG. 2B, such that the front wall 21 of the shuttle member 27 abuts the axially inwardly facing wall 52 of the first rotary seal ring 42. The barrier fluid exerts pressure on the piston area B, which transmits a closing force to the rotary seal face 46 to ensure a fluid tight seal between the rotary seal member 42 and the stationary seal member 54. Piston area B extends from the fixed inner diameter of the seal face 46 to the fixed inner diameter of the step 23 on the movable shuttle member 27.

The O-ring 35 is free to move in the groove 32, depending on which fluid pressure force is greater. The freedom of movement facilitates formation of the piston areas and application of the closing force to the seal faces.

The barrier fluid, which generally has a higher pressure than the atmosphere, exerts a pressure on the piston area A' defined by the walls 52a', 52b' opposite the seal face 46' on the second rotary seal ring 42' to bias the secondary seal faces 46', 58' together (shown in FIGS. 1A and 1B).

Each piston area is defined by the extent to which the associated wall or walls overlap the contact area of the seal faces. In double balanced seal assemblies, it is preferable that the closing force exerted on the seal faces in standard operating conditions be equal to the closing force exerted on the seal faces in reverse operating conditions. The piston area for each pressure condition can be designed to achieve the desired percentage of contact area of the seal faces 46, 58. Preferably, piston area A is equal to between 50% and 100% of the contact area of the seal faces 46, 58. More preferably, the piston area is between about 60% and about 80% of the contact area of the seal faces 46, 58 and most preferably about 70%. Barrier fluid entering through the ports 110 of gland 90 is sealed from the process fluid by the seal faces 46, 58 and O-rings 35, 37 and 93 in grooves 32, 33 and 91, respectively. The barrier fluid passes through the chamber 65 and exerts pressure on walls 52, 52' on the opposite sides of rotary seal members 42, 42' from the seal faces 46 and 46', at piston areas B and A'. These piston areas comprise between about 50% and about 100%, or preferably between about 60% and about 80%, or most preferably about 70% of the contact areas of the seal faces 46, 58 and 46', 58', respectively.

Advantageously, the contact area of the seal faces are not limited by O-ring size, and hence are O-ring independent, and can be designed to be as small as feasible to minimize heat generation. The piston areas A, A' of the rotary seal members 42, 42', where pressure from the process fluid and the barrier fluid, respectively, is applied, can each be somewhat smaller than the face area of seal ring 42 in contact with stationary seal member 54, where pressure from the process fluid is applied. The seal of the illustrative embodiment of the invention always produces a net closing force on the seal faces, whether operating under standard or reverse operating conditions.

Furthermore, the interface between the movable shuttle member and the rotary seal member 42 is a clean surface. As a result, the movable shuttle member 27 does not slide over a dirty surface, which significantly reduces wear on the shuttle member and prevents hang-ups over time.

Figure 3B:
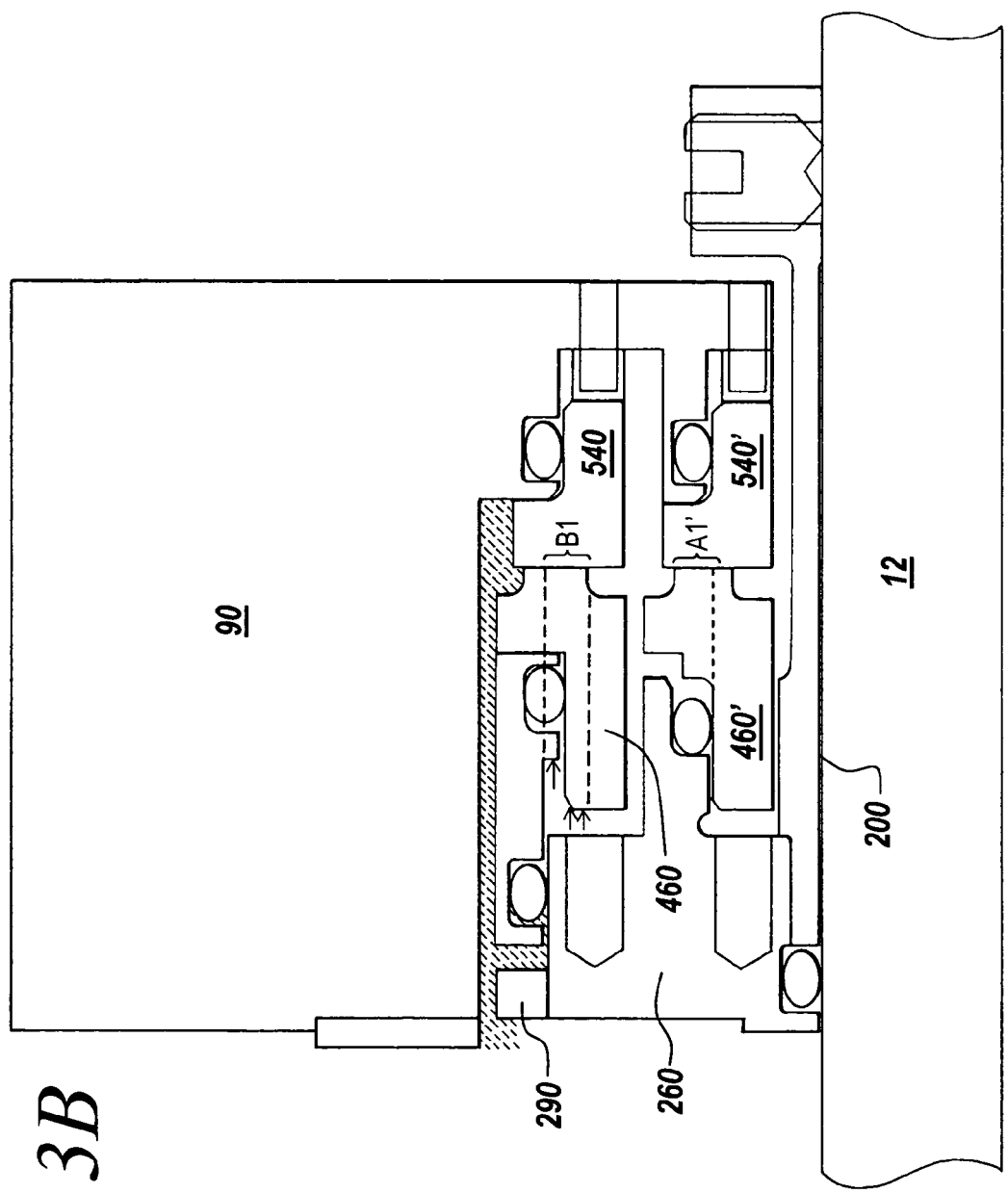
FIG. 3B is a cross-sectional view of the mechanical seal of FIG. 3A, where the pressure of the barrier fluid is greater than the pressure of the process fluid, i.e., a reverse or negative pressure condition.

FIGS. 3A and 3B illustrate a mechanical seal assembly 100 according to an alternate embodiment of the invention for mounting the stationary housing 14 to the rotating shaft 12. The mechanical seal assembly 100 of FIGS. 3A and 3B is housed within the gland 90, though one skilled in the art will recognize that the seal assembly 100 may be located in any suitable position relative to the gland 90. As shown in FIGS. 3A and 3B, a secondary pair of relatively rotatable seal members or rings 460' and 540' are radially inwardly spaced from a primary pair of relatively rotatable seal members 460 and 540 in the seal 100. In FIG. 3A, the process fluid has a higher pressure than the barrier fluid, and in FIG. 3B the barrier fluid has a higher pressure than the process fluid.

Corresponding elements of the mechanical seal assembly 100 are configured similarly to the mechanical seal assembly 10 illustrated in FIGS. 1A and 1B. For example, the rotary seal rings have substantially the same configuration as the rotary seal rings of the mechanical seal 10 of FIGS. 1A and 1B, but are located in different positions relative to each other.

The mechanical seal 100 includes a movable shuttle member 270 overlying and sealing against a flange 260 of a rotary sleeve 200 and the primary rotary seal member 460. The shuttle member 270 is substantially identical to the shuttle member 27. Similar to the shuttle member 27 described with respect to FIGS. 1A-2B, the shuttle member 270 slides between a shuttle stop 290 and the back surface 520 of the primary rotary seal member 460 in response to varying pressure conditions. The shuttle member 270 defines and exposes piston areas A1, B1 for biasing the seal faces 480, 580 together.

As shown in FIG. 3A, when the process fluid pressure is greater than the barrier fluid pressure, the movable shuttle member 270 is pushed toward and abuts the shuttle stop 290. The front wall 210 of the shuttle member is spaced from the back wall 520 of the primary rotary seal member 460 to allow process fluid therebetween, thus defining piston area A1. The process fluid exerts a closing pressure on the seal faces 480, 580 via the piston area A1.

As shown in FIG. 3B, when the barrier fluid pressure is greater than the process fluid pressure, the pressure differential across the shuttle member 270 pushes the shuttle member forward, such that the front wall 210 of the shuttle member abuts the back wall 520 of the primary rotary seal member 420. The shuttle member defines a piston area B1 on walls 440 and 530, which translates a closing force to the seal faces 460, 580. The higher pressure barrier fluid exerts a force on the piston area B1, which translates to the seal faces. The piston areas A1, A1', and B1 comprise between about 50% and about 100%, preferably between about 60% and about 80%, and most preferably about 70% of the contact areas of the respective seal faces.

Figure 4B:
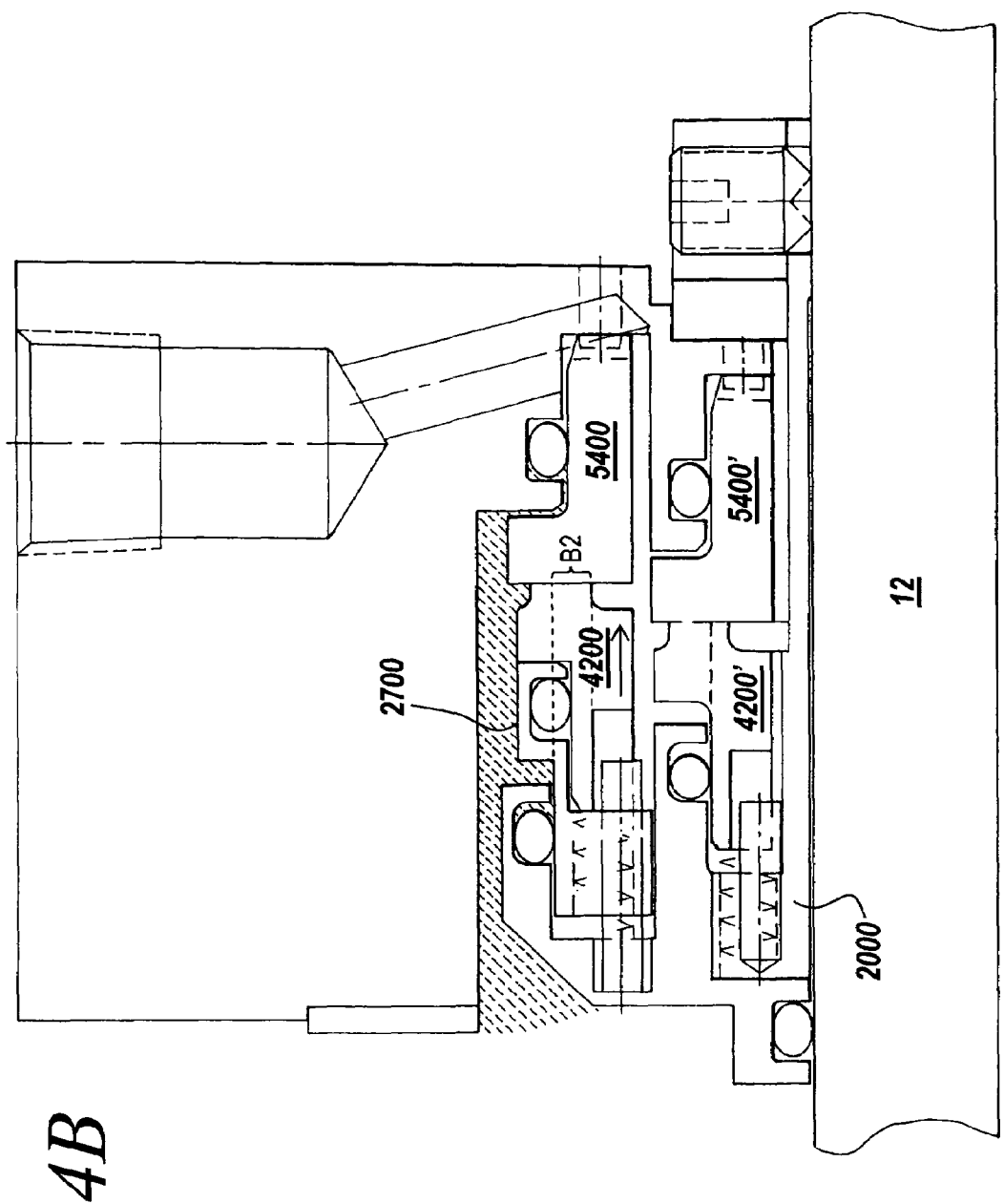
FIG. 4B is a cross-sectional view of the mechanical seal of FIG. 4A, wherein the pressure of the barrier fluid is greater than the pressure of the process fluid.

FIGS. 4A and 4B illustrate a mechanical seal assembly 1000 according to another embodiment of the invention for mounting a stationary housing 14 to a rotating shaft 12. In the mechanical seal assembly 1000 of FIGS. 4a and 4b, a secondary pair of relatively rotatable seal members 4200' and 5400' are radially inwardly spaced from a primary pair of relatively rotatable seal members 4200 and 5400. In FIG. 4A, the process fluid has a higher pressure than the barrier fluid and in FIG. 4B, the barrier fluid has a higher pressure than the process fluid.

As shown, the mechanical seal assembly 1000 includes a primary pair of relatively rotatable seal members for providing a fluid seal between a barrier fluid and a process fluid. The mechanical seal assembly 1000 includes a secondary pair of relatively rotatable seal members 4200' and 5400' axially aligned with and disposed radially inwardly from the primary pair of relatively rotatable seal members. The seal assembly further includes a sleeve 2000 connected to the shaft, including a flange 2600 and a first O-ring 2400 in a groove 2200 for sealing the process fluid from passing along the shaft, and a gland 9000 connected to the stationary housing 14, including a gasket 9600 in a groove 9500 for sealing the gland against the housing. The seal assembly further includes a first spring 98 and a second spring 99 for providing an initial biasing force on the primary seal faces 4600, 5800 and the secondary seal faces 4600' and 5800' respectively.

A movable shuttle member 2700 is disposed between the flange, which defines a stop for the shuttle member 2700, and the primary rotary seal member 4200. The shuttle member 2700 is configured differently that the shuttle members 27 and 270. The illustrated shuttle member 2700 includes a carrier element that has a first end portion 270 that has a groove 2702 that seats a sealing element 2704. The shuttle member also includes a second rear portion 2712 that is configured to be disposed within the flange portion of the sleeve 2000.

The movable shuttle member defines piston area A2 or B2, depending on the pressure conditions of the seal 1000. The shuttle member 2700 comprises a main body 2701, an axially forward portion 2702 and a neck 2703 connecting the main body and the axially forward portion. The sleeve includes two arms 2001 and 2002. The first arm 2001 includes a groove 2005 having an O-ring 2006 for sealing against the outer surface of the main body 2701. The second arm 2002 includes a groove 2007 having an O-ring for sealing against the secondary rotary sealing member 4200'. The axially forward portion 2702 of the shuttle member 2700 includes a groove 2710 having an O-ring 2711 for sealing the process fluid from the barrier fluid in the seal assembly 1000.

As shown, when the process fluid pressure is greater, the movable shuttle member 2700 abuts the first arm 2001, allowing process fluid to enter the space between the axially inwardly facing wall 5200 of the primary rotary seal member 4200 and the front surface of the shuttle member 2700 and exert a pressure on piston area A2, defined by the wall 5200 and comprising between 50% and about 100% of the contact area of the seal faces. When the barrier fluid pressure is greater, the movable shuttle member abuts the axially inwardly facing wall 5200 of the primary rotary seal member. The axially inwardly facing wall 2750 of the movable shuttle member defines piston area B2, which transmits a force from the barrier fluid to the seal face. Piston area B2 is preferably between about 50% and about 100% of the seal face contact area. The piston areas A2 and B2 preferably comprise between about 60% and about 80% of the seal face contact area and more preferably about 70% of the seal face contact area.

Figure 5:
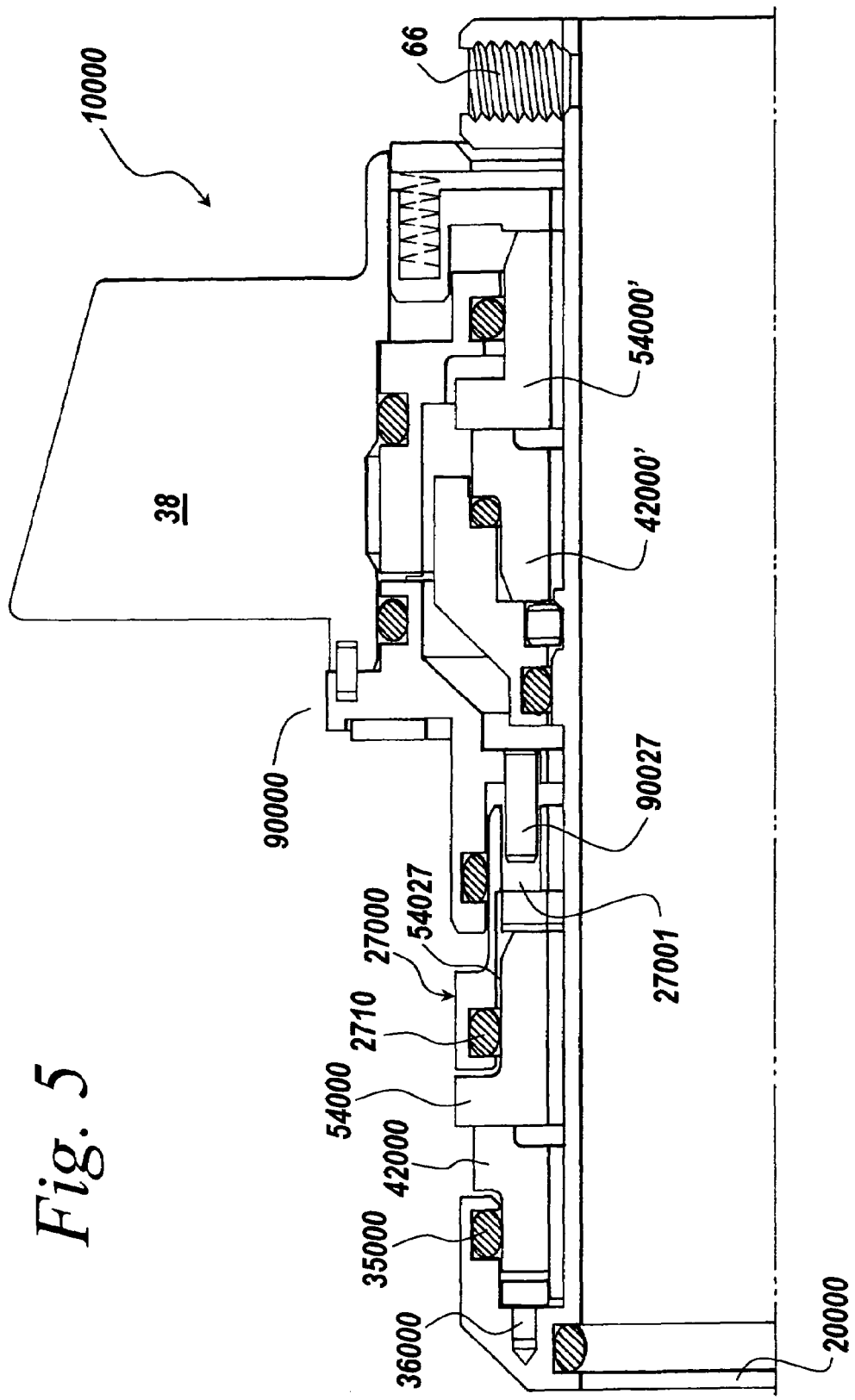
FIG. 5 is a cross-sectional side view of another embodiment of the mechanical seal of the present invention having a shuttle member disposed adjacent to a stationary seal ring.

According to another embodiment of the invention, a mechanical seal includes a shuttle member disposed adjacent to a rotary seal ring to define a piston area in response to a pressure condition, for example, as shown in FIG. 5. In FIG. 5, a mechanical seal 10000 includes a sleeve 20000 rotatably coupled to a shaft, which holds the rotary elements of the mechanical seal 10000. A primary rotary seal ring 42000 is mounted on the sleeve 20000 using an O-ring 35000 and a pin 36000, or other suitable means. A primary stationary seal ring 54000 is connected to a stationary gland component 90000 and engages the primary rotary seal ring 42000 to provide a sealed interface. A second or outboard pair of primary seal members, forming a second or outboard seal, comprises seal rings 42000' and 54000'. The secondary seal rings 42000' and 54000' have seal faces that are biased into sealing relationship with each other to provide additional sealing. The first and second pair of primary seal members form a dual or tandem mechanical seal. A movable shuttle member 27000 is provided in connection with the primary stationary seal member 54000 for defining different piston areas on the seal faces of the primary seal rings 42000 and 54000 in response to different pressure conditions within the seal 10000.

As shown, the shuttle member 27000 includes an axial hole 27001 for receiving a pin 90027 inserted in the gland 90000. The pin 90027 prevents rotary movement of the shuttle member 27000, while enabling the shuttle member 27000 to slide in an axial direction in response to varying pressure conditions. The shuttle member 27000 preferably includes an O-ring 2710 disposed in a groove for engaging an axially extending surface 54027 of the primary stationary seal member. In the embodiment shown in FIG. 5, an axially inner portion of the shuttle member 27000 slides across the axially extending surface 54027 on an axially outer portion of the stationary seal ring 54000 in response to different pressure conditions.

For example, under normal operating conditions, when the process fluid pressure is higher than the barrier fluid pressure, the process fluid pushes the shuttle member 27000 to a first position relative to the stationary seal member 54000, to expose a first piston area. The first piston area transfer a closing force from the process fluid to the engaged seal faces on the primary seal members to bias the seal faces together. Under reverse operating conditions, when the barrier fluid pressure is greater than the process fluid pressure, the barrier fluid pushes the shuttle member to a second position relative to the stationary seal member to expose a second piston area for biasing the seal faces together.

The shuttle member 27000 may be spring biased to facilitate sliding of the shuttle member between the first and second position.

In the embodiment shown in FIG. 5, the use of a shuttle member coupled to a stationary seal member enables the primary and secondary seal members to have the same configuration, i.e., the seal member configuration does not have to be modified in order to accommodate the shuttle member. The ability to have primary and secondary seal members of the same configuration facilitates stocking, assembly and repair of the mechanical seal.

The present invention utilizes a movable shuttle member to define piston areas on the back of a primary seal member through a variety of pressure conditions, even under reverse pressure. The mechanical seal is configured to provide a closing force on the seal faces via a selected piston area. The piston area remains constant for all pressure conditions and is generally less than the contact area of the seal faces.

The present invention provides significant advantages over double balanced seals of the prior art. The mechanical seal of the present invention maintains a net closing force on the seal faces regardless of pressure fluctuations, or even upon reversal of the pressures in the liquids being sealed. The closing force is independent of the size, configuration and location of the O-rings. In addition, to bias the seal face, the shuttle member slides over a clean surface, which reduces clogging, improves performance and extends the operating life of the seal.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and protected by Letters Patent is.

What is claimed is:

1. A mechanical seal for mounting to a housing containing a rotating shaft, said mechanical seal comprising:
   a gland;
   at least one pair of seal members disposed at least partially within the gland, said seal members including a rotary seal ring having a rotary seal face and a stationary seal ring having a stationary seal face engaging the rotary seal face; and
   a shuttle member positioned relative to one of the rotary seal ring and the stationary seal ring and axially movable between a first position and a second position in response to changing pressure conditions within the mechanical seal, wherein the shuttle member is axially separated from the non-seal face of the seal ring when disposed in the first position when subjected to a first pressure condition, and is positioned to be contacting a non-seal face of one of the seal rings when disposed in the second position when subjected to a second pressure condition different from said first condition, the shuttle member comprising a carrier element having a first end portion adapted to be disposed proximate to the non-seal face of the rotary and stationary seal rings, and a second end portion opposite the first end portion which extends axially beyond the one of the rotary and stationary seal rings.

2. The mechanical seal of claim 1, wherein the shuttle member generates a biasing force when disposed in at least one of the positions in response to one of the pressure conditions.

3. The mechanical seal of claim 1, wherein the shuttle member is disposed adjacent the rotary seal ring.

4. The mechanical seal of claim 1, wherein the shuttle member is disposed adjacent the stationary seal ring.

5. The mechanical seal of claim 1, wherein the carrier element further comprises a groove for seating a sealing element.

6. The mechanical seal of claim 5, wherein the sealing element is an O-ring.

7. The mechanical seal of claim 1, wherein the housing includes first and second grooves for mounting first and second sealing elements, respectively.

8. The mechanical seal of claim 1, further comprising a sleeve adapted to be mounted about the shaft, said sleeve including a flange portion, and wherein the shuttle member is disposed between the flange and the rotary seal ring.

9. The mechanical seal of claim 8, wherein the first pressure condition is a positive pressure condition, and wherein the shuttle member is disposed in the first position during the positive pressure condition such that a first end of the shuttle member is axially spaced from the non-seal face of the rotary seal ring.

10. The mechanical seal of claim 8, wherein the second pressure condition is a negative pressure condition, and wherein the shuttle member is disposed in the second position during the negative pressure condition such that a first end of the shuttle member contacts the non-seal face of the rotary seal ring.

11. The mechanical seal of claim 1, wherein shuttle member defines a first radially extending piston area on the rotary seal ring for biasing the rotary seal ring against the stationary seal ring under the first pressure condition and a second radially extending piston area on the rotary seal ring for biasing the rotary seal ring against the stationary seal ring under the second pressure condition.

12. The mechanical seal of claim 11, wherein the first piston area is defined by an outer edge of the radially extending seal face of one of the seal rings and an axially extending, inner surface of the shuttle member.

13. The mechanical seal of claim 11, wherein the second piston area is defined by an inner edge of the radially extending seal face of one of the seal rings and an axially extending, inner surface of the shuttle member.

14. The mechanical seal of claim 11, wherein a process fluid exerts a force on the first piston area.

15. The mechanical seal of claim 11, wherein a barrier fluid exerts a force on the second piston area.

16. The mechanical seal of claim 1, further comprising
a first piston area defined by an outer edge of the radially extending seal face of one of the seal rings and an axially extending, inner surface of the shuttle member, and
a second piston area defined by an inner edge of the radially extending seal face of one of the seal rings and an axially extending, inner surface of the shuttle member.

17. The mechanical seal of claim 16, wherein the first piston area and the second piston area are about equal in size.

18. The mechanical seal of claim 16, wherein the first piston area and the second piston area are smaller than a contact area of the rotary seal face and the stationary seal face.

19. The mechanical seal of claim 16, wherein the first piston area and the second piston area are between about 50% and about 100% of a contact area of the rotary seal face and the stationary seal face.

20. The mechanical seal of claim 16, wherein the first piston area and the second piston area are about 70% of the contact area of the rotary seal face and the stationary seal face.

21. The mechanical seal of claim 1, wherein the gland comprises means for introducing a barrier fluid to the seal.

22. The mechanical seal of claim 1, further comprising a second pair of seal members disposed axially outwardly away from the first pair of seal members, said second pair of seal members including a rotary seal ring and a stationary ring.

23. The mechanical seal of claim 1, further comprising
a sleeve adapted to be mounted about the shaft, said sleeve including a flange portion, and
a shuttle stop disposed adjacent to an outer surface of the flange portion of the sleeve,
wherein the shuttle member is disposed between the shuttle stop and the rotary seal ring.

24. The mechanical seal of claim 23, wherein the second pressure condition is a negative pressure condition, and wherein the shuttle member is disposed in the second position during the negative pressure condition such that a first end of the shuttle member contacts the non-seal face of one of the seal rings.

25. The mechanical seal of claim 24, wherein the shuttle member contacts the non-seal face of the rotary seal ring.

26. The mechanical seal of claim 23, wherein the first pressure condition is a positive pressure condition and the shuttle member has a first end disposed proximate the non-seal face of one of the seal rings and a second end opposite the first end disposed proximate the shuttle stop, and
wherein the shuttle member is disposed in the first position during the positive pressure condition such that the second end of the shuttle member contacts the shuttle stop.

27. The mechanical seal of claim 1, wherein the shuttle member abuts a shuttle stop during the first pressure condition when the pressure of a process fluid in the seal is greater than the pressure of a barrier fluid in the seal to define a first piston area on the non-seal-face of the rotary seal ring.

28. The mechanical seal of claim 1, wherein the shuttle member abuts the non-seal face of the rotary seal ring during the second pressure condition when the pressure of a barrier fluid in the seal is greater than the pressure of a process fluid in the seal to define a second piston area on the non-seal-face of the rotary seal ring.

29. The mechanical seal of claim 1, wherein the shuttle member comprises:
an axially outer portion configured to overlie and seal against a stepped portion of the rotary seal ring, the axially outer portion having an inner diameter that is slightly greater than the outer diameter of the stepped portion of the rotary seal ring;
an axially inner portion that is narrower than the axially outer portion configured to overlie and seal against the flange of the sleeve; and
a step defining a radially extending wall between the axially inner portion and the axially outer portion.

30. In a mechanical seal for mounting to a housing containing a rotating shaft, the mechanical seal including a gland; at least one pair of seal members disposed at least partially within the gland, said seal members including a rotary seal ring having a rotary seal face and a stationary seal ring having a stationary seal face engaging the rotary seal face; and a shuttle member positioned relative to one of the rotary seal ring and the stationary seal ring, wherein the shuttle member comprises a carrier element having a first end portion adapted to be disposed proximate to the non-seal face of the rotary and stationary seal rings, and a second end portion opposite the first end portion which extends axially beyond the one of the rotary and stationary seal rings, a method comprising axially moving the shuttle member between a first position and a second position in response to changing pressure conditions within the mechanical seal, wherein the shuttle member is axially separated from the non-seal face of the seal ring when disposed in the first position when subjected to a first pressure condition, and is positioned to be contacting a non-seal face of one of the seal rings when disposed in the second position and when subjected to a second pressure condition different from said first condition.

31. The method of claim 30, further comprising generating a biasing force with the shuttle member when disposed in at least one of the first and second positions in response to one of the first and second pressure conditions.

32. The method of claim 30, further comprising disposing the shuttle member adjacent the rotary seal ring.

33. The method of claim 30, further comprising disposing the shuttle member adjacent the stationary seal ring.

34. The method of claim 30, wherein the mechanical seal further comprises a sleeve adapted to be mounted about the shaft, said sleeve including a flange portion, and wherein the shuttle member is disposed between the flange and the rotary seal ring, comprising disposing the shuttle member in the first position when a positive pressure condition exists in the seal, such that a first end of the shuttle member is axially spaced from the non-seal face of the rotary seal ring, and disposing the shuttle member in the second position when a negative pressure condition exists in the seal, such that a first end of the shuttle member is disposed axially adjacent to the non-seal face of the rotary seal ring.

35. The method of claim 30, further comprising defining a first radially extending piston area on the rotary seal ring for biasing the rotary seal ring against the stationary seal ring under the first pressure condition, and defining a second radially extending piston area on the rotary seal ring for biasing the rotary seal ring against the stationary seal ring under the second pressure condition.

36. The method of claim 30, further comprising defining a first piston area by an outer edge of the radially extending seal face of one of the seal rings and an axially extending, inner surface of the shuttle member, and defining a second piston area by an inner edge of the radially extending seal face of one of the seal rings and an axially extending, inner surface of the shuttle member.

37. The method of claim 36, further comprising:

sizing the first piston area and the second piston area to be about equal in size.

38. The method of claim 36, further comprising:

sizing the first piston area and the second piston area to be-smaller than a contact area of the rotary seal face and the stationary seal face.

39. The method of claim 36, further comprising:

sizing the first piston area and the second piston area to be between about 50% and about 100% of a contact area of the rotary seal face and the stationary seal face.

40. The method of claim 36, further comprising:

sizing the first piston area and the second piston area to be about 70% of the contact area of the rotary seal face and the stationary seal face.

41. The method of claim 30, wherein the seal further includes a sleeve adapted to be mounted about the shaft, said sleeve including a flange portion, and a shuttle stop disposed adjacent to an outer surface of the flange portion of the sleeve, comprising disposing the shuttle member between the shuttle stop and the rotary seal ring.

42. The method of claim 41, wherein the first pressure condition is a positive pressure condition, comprising disposing the shuttle member in the first position during the positive pressure condition such that one end of the shuttle member contacts the shuttle stop.

43. The method of claim 41, wherein the second pressure condition is a negative pressure condition, comprising disposing the shuttle member in the second position during the negative pressure condition such that one end of the shuttle member contacts the non-seal face of one of the seal rings.

* * * * *